(No Model.)

W. P. DOLLOFF.
CHARM FOR WATCH CHAINS.

No. 260,088. Patented June 27, 1882.

WITNESSES:
Charles Hannigan
Socrates Scholfield

INVENTOR:
Wallington P. Dolloff

United States Patent Office.

WELLINGTON P. DOLLOFF, OF PROVIDENCE, RHODE ISLAND.

CHARM FOR WATCH-CHAINS.

SPECIFICATION forming part of Letters Patent No. 260,088, dated June 27, 1882.

Application filed April 25, 1882. (No model.)

*To all whom it may concern:*

Be it known that I, WELLINGTON P. DOLLOFF, of Providence, in the State of Rhode Island, have invented an Improvement in the Manufacture of Charms for Watch-Chains, of which the following is a specification.

The nature of my invention consists in joining the two opposite rims or settings of a charm by turning the edge of one of the rims over the corresponding edge of the other, as hereinafter fully set forth.

Figure 1:
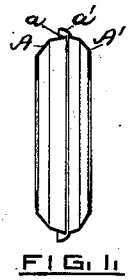
Figure 2:
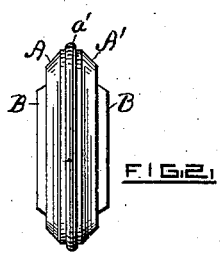
Figure 3:
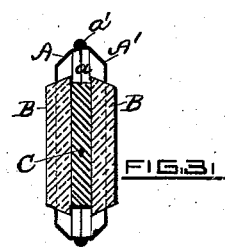

Figure 1 represents a central vertical section of the two rims or settings placed together, showing the form in which they are struck up in the die. Fig. 2 represents an edge view of the charm after the setting-rims have been joined by turning the edge of one upon the corresponding edge of the other. Fig. 3 represents a transverse vertical section of Fig. 1.

In the manufacture of charms for watch-chains, having a stone inclosed in a setting at opposite sides of the charm, it has been customary to stamp out two rims, in each of which a stone was to be secured by means of a metal plate soldered inside of the rim at the back of the stone, and then, after grinding down the back edges of the rims and placing a spring between the two back plates, soldering the setting-rims together, edge to edge, the inclosed spring serving to hold the soldered back plates in position against the back of their respective stones whenever the solder at the edges of the inclosed back plates becomes softened by the heat applied for soldering the abutting edges of the setting-rims. This method of joining the several parts of the charm is expensive, and in finishing up the charm after being thus soldered the base metal at the soldered edge is liable to become exposed, thus detracting from the value of such articles when made in rolled plates; but by my improvement I dispense with solder and construct a charm having a perfect plated edge, and also materially lessen the cost of such articles.

In the drawings, A is a setting-rim struck up so as to enter within the raised edge of the opposite setting, A', as shown in section in Fig. 1.

In securing the several parts of the charm to each other I first place a suitable stone, B, in each of the setting-rims A A', and place them back to back, with a piece of wax or cement, C, between the backs of the stones B, and turn the edge a' of the setting-rim A' down over the edge a of the setting-rim A, thus securing the setting-rims firmly to each other with the stones in proper position. I turn the edge a' by means of a grooved wheel made to suitably inclose the turned edge, and can thus rapidly unite the parts in a permanent manner.

Instead of wax or cement for holding the stones B firmly against the setting-rims, so as to resist inward pressure tending to loosen the stone from its setting, any material of suitable thickness—as pasteboard or a loose plate of metal—may be employed.

I claim as my invention—

In a charm for watch-chains, the combination of the stones B B with the intervening material, C, adapted to hold the stones against the setting-rims, and the setting-rims A A', made to fit one within the other, and having the outer rim, a', turned down over the inner rim, a, substantially as described.

WELLINGTON P. DOLLOFF.

Witnesses:
SOCRATES SCHOLFIELD,
F. L. SHELDON.